United States Patent
Rapp et al.

(10) Patent No.: US 8,358,900 B2
(45) Date of Patent: Jan. 22, 2013

(54) FIBER OPTIC MODULE WITH ADAPTERS MOUNTED AT OPEN FRONT

(75) Inventors: David E. Rapp, Eden Prairie, MN (US); Timothy J. Haataja, Prior Lake, MN (US); Kristofer J. Bolster, Jordan, MN (US); Heidi L. Miller, Shakopee, MN (US)

(73) Assignee: ADC Telecommunications, Inc., Eden Prairie, MN (US)

(*) Notice: Subject to any disclaimer, the term of this patent is extended or adjusted under 35 U.S.C. 154(b) by 0 days.

(21) Appl. No.: 13/155,978

(22) Filed: Jun. 8, 2011

(65) Prior Publication Data
US 2011/0317973 A1 Dec. 29, 2011

Related U.S. Application Data

(60) Continuation of application No. 12/911,404, filed on Oct. 25, 2010, now Pat. No. 7,983,521, which is a continuation of application No. 12/495,355, filed on Jun. 30, 2009, now Pat. No. 7,822,313, which is a continuation of application No. 12/077,801, filed on
(Continued)

(51) Int. Cl.
*G02B 6/00* (2006.01)
(52) U.S. Cl. ...................................... 385/135
(58) Field of Classification Search .............. 385/135, 385/136, 137, 134; 439/348, 372, 374, 377
See application file for complete search history.

(56) References Cited

U.S. PATENT DOCUMENTS

| | | | |
|---|---|---|---|
| 4,630,886 A | 12/1986 | Lauriello et al. |
| 4,747,020 A | 5/1988 | Brickley et al. |
| 4,765,710 A | 8/1988 | Burmeister et al. |
| 4,995,688 A | 2/1991 | Anton et al. |
| 5,067,784 A | 11/1991 | Debortoli et al. |
| 5,071,211 A | 12/1991 | Debortoli et al. |
| 5,129,030 A | 7/1992 | Petrunia |
| 5,167,001 A | 11/1992 | Debortoli et al. |
| 5,179,618 A | 1/1993 | Anton |
| 5,289,558 A | 2/1994 | Teichler et al. |
| 5,317,663 A | 5/1994 | Beard et al. |
| 5,353,367 A | 10/1994 | Czosnowski et al. |
| 5,363,465 A | 11/1994 | Korkowski et al. |

(Continued)

FOREIGN PATENT DOCUMENTS

| | | |
|---|---|---|
| DE | 42 29 510 A1 | 3/1994 |
| EP | 0 697 610 A1 | 2/1996 |

(Continued)

OTHER PUBLICATIONS

"ADC OMX 600 Optical Distribution Frame Solution," *ADC Telecommunications, Inc.*, Publication No. 856, 8 pgs. (Feb. 2000).

(Continued)

*Primary Examiner* — Chandrika Prasad
(74) *Attorney, Agent, or Firm* — Merchant & Gould P.C.

(57) ABSTRACT

A fiber optic telecommunications frame is provided including termination modules positioned on left and right sides of the frame. The frame further includes left and right vertical cable guides. The frame includes a horizontal passage linking the left and right panels and the cable guides. The termination modules hold fiber optic modules with front termination locations. The fiber optic modules can house couplers, such as splitters, combiners, and wave length division multiplexers. A retention mechanism retains each fiber optic module in a partially removed position from the termination module.

15 Claims, 12 Drawing Sheets

Related U.S. Application Data

Mar. 20, 2008, now Pat. No. 7,555,193, which is a continuation of application No. 11/411,414, filed on Apr. 25, 2006, now Pat. No. 7,367,823, which is a division of application No. 11/151,932, filed on Jun. 13, 2005, now Pat. No. 7,142,765, which is a division of application No. 10/745,918, filed on Dec. 23, 2003, now Pat. No. 6,920,274.

(56) References Cited

U.S. PATENT DOCUMENTS

| | | | |
|---|---|---|---|
| 5,402,515 | A | 3/1995 | Vidacovich et al. |
| RE34,955 | E | 5/1995 | Anton et al. |
| 5,432,875 | A | 7/1995 | Korkowski et al. |
| 5,497,444 | A | 3/1996 | Wheeler |
| 5,689,604 | A | 11/1997 | Janus et al. |
| 5,717,810 | A | 2/1998 | Wheeler |
| 5,734,776 | A | 3/1998 | Puetz |
| 5,758,002 | A | 5/1998 | Walters |
| 5,758,003 | A | 5/1998 | Wheeler et al. |
| 5,774,245 | A | 6/1998 | Baker |
| 5,903,698 | A | 5/1999 | Poremba et al. |
| 5,966,492 | A | 10/1999 | Bechamps et al. |
| 6,044,193 | A | 3/2000 | Szentesi et al. |
| 6,424,781 | B1 | 7/2002 | Puetz et al. |
| 6,535,682 | B1 | 3/2003 | Puetz et al. |
| 6,556,763 | B1 | 4/2003 | Puetz et al. |
| 6,631,237 | B2 | 10/2003 | Knudsen et al. |
| 6,760,531 | B1 | 7/2004 | Solheid et al. |
| 6,793,517 | B2 | 9/2004 | Neer et al. |
| 6,850,685 | B2 | 2/2005 | Tinucci et al. |
| 6,888,069 | B1 | 5/2005 | Chen et al. |
| 6,920,274 | B2 | 7/2005 | Rapp et al. |
| 6,937,800 | B2 | 8/2005 | Cote |
| 7,142,765 | B2 | 11/2006 | Rapp et al. |
| 7,346,254 | B2 * | 3/2008 | Kramer et al. ........... 385/135 |
| 7,367,823 | B2 | 5/2008 | Rapp et al. |
| 7,376,321 | B2 | 5/2008 | Bolster et al. |
| 7,376,322 | B2 * | 5/2008 | Zimmel et al. ........... 385/135 |
| 7,555,193 | B2 | 6/2009 | Rapp et al. |
| 7,822,313 | B2 | 10/2010 | Rapp et al. |
| 2003/0095772 | A1 | 5/2003 | Solheid et al. |
| 2005/0003697 | A1 | 1/2005 | Neer et al. |
| 2005/0048831 | A1 | 3/2005 | Neer et al. |
| 2006/0029353 | A1 | 2/2006 | Bolster et al. |
| 2006/0093301 | A1 * | 5/2006 | Zimmel et al. ........... 385/135 |
| 2006/0269205 | A1 * | 11/2006 | Zimmel ........... 385/135 |
| 2006/0269206 | A1 * | 11/2006 | Zimmel ........... 385/135 |
| 2007/0047893 | A1 * | 3/2007 | Kramer et al. ........... 385/135 |
| 2010/0322577 | A1 | 12/2010 | Bolster et al. |

FOREIGN PATENT DOCUMENTS

| | | |
|---|---|---|
| EP | 0 871 047 A1 | 10/1998 |
| WO | WO 00/05611 | 2/2000 |
| WO | WO 00/52504 | 9/2000 |

OTHER PUBLICATIONS

"OMX™ 600 Optical Distribution Frame," *ADC Telecommunications, Inc.*, Publication No. 854, front cover, table of contents, pp. 1-13, rear cover (Apr. 2000).

ADC Telecommunications brochure entitled "Fiber Cable Management Products, Second Edition," 149 pages, dated Oct. 1995.

ADC Telecommunications brochure entitled "FL2000 Products," 48 pages, dated Nov. 1996.

ADC Telecommunications brochure entitled "Next Generation Frame (NGF) Product Family Ordering Guide," 22 pages, dated Oct. 1998.

ADC Telecommunications, Inc., 600 mm Products copied brochure, Value-Added Module System, Oct. 2003, pp. 53-78.

ADC Telecommunications, Inc., copied product brochure, Fiber Management Tray, Mar. 2003, pp. 1-8.

ADC Telecommunications, Inc., FMT Micro Value Added Monitor Module Configuration Scheme, Feb. 6, 2003, pp. 1-2.

ADC Telecommunications, Inc., Mini VAM Connector Cleaning Instructions, ADCP-90-412, Issue 3, Sep. 2002, pp. 1-8.

ADC Telecommunications, Inc., Mini VAM Splitter Mod (Installation Drawing), Drawing No. 1128185, technical drawing of the VAM pictured in Exhibit D, Mar. 14, 2001, 2 page.

ADC Telecommunications, Inc., Next Generation Frame (NGF) Product Tour, Value Added Modules (VAMs), Copyright 2003, (admitted as offered for sale as of the effective filed of this application), 1 page.

Installation Instructions for 12-position Splice Protector Insert from Corning Cable Systems, SRP-001-276, Issue 4, Jul. 2001, 1 page.

Jumper Routing Procedure for Enhanced Management Frame, Corning Cable Systems, SRP-003-599, Issue 2, Apr. 2002, 4 pages.

\* cited by examiner

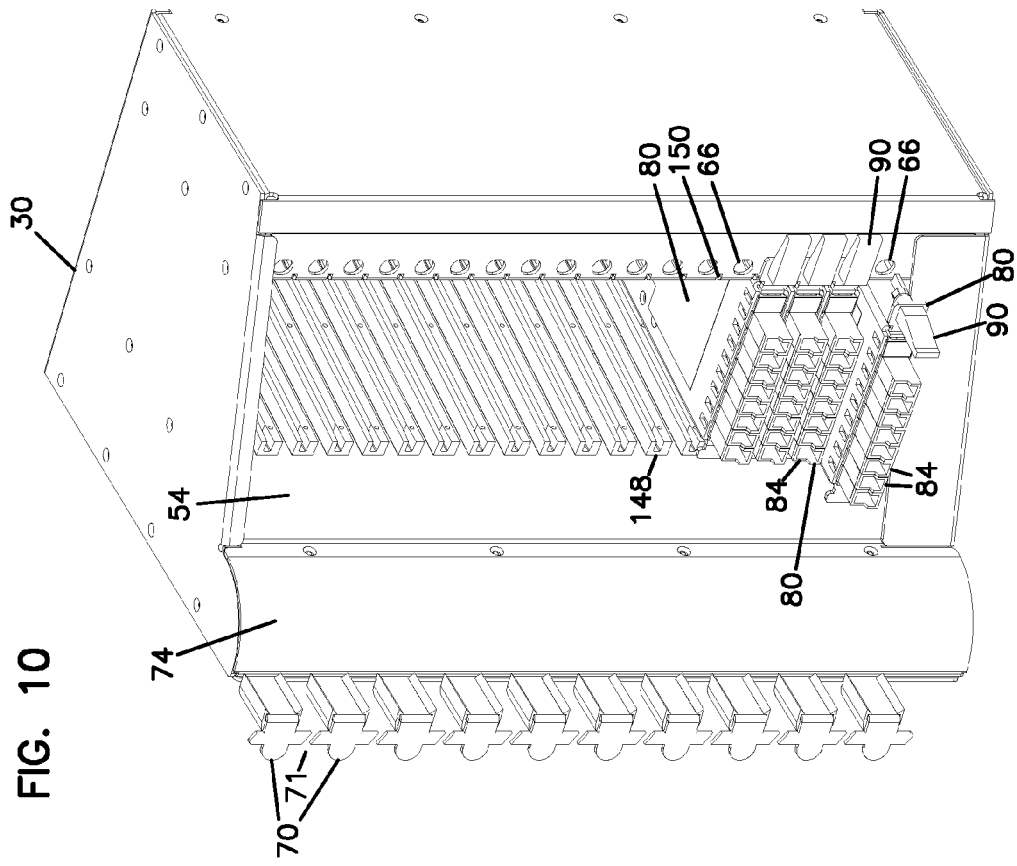
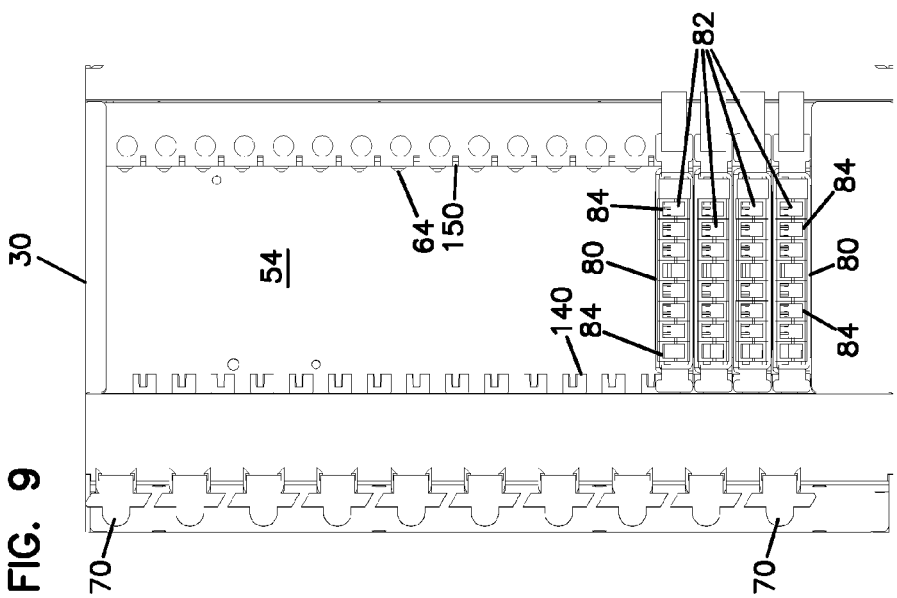

FIBER OPTIC MODULE WITH ADAPTERS MOUNTED AT OPEN FRONT

CROSS REFERENCE TO RELATED APPLICATIONS

This application is a continuation of application Ser. No. 12/911,404, filed Oct. 25, 2010, now U.S. Pat. No. 7,983,521, which is a continuation of application Ser. No. 12/495,355, filed Jun. 30, 2009, now U.S. Pat. No. 7,822,313, which is a continuation of application Ser. No. 12/077,801, filed Mar. 20, 2008, now U.S. Pat. No. 7,555,193, which is a continuation of application Ser. No. 11/411,414, filed Apr. 25, 2006, now U.S. Pat. No. 7,367,823, which is a divisional of application Ser. No. 11/151,932, filed Jun. 13, 2005, now U.S. Pat. No. 7,142,765, which is a divisional of application Ser. No. 10/745,918, filed Dec. 23, 2003, now U.S. Pat. No. 6,920,274, which applications are incorporated herein by reference in their entirety.

FIELD

This invention pertains to the telecommunications industry. More particularly, this invention pertains to a high-density fiber distribution frame for use in the telecommunications industry.

BACKGROUND

In the telecommunications industry, use of fiber optic cables for carrying transmission signals is rapidly growing. To connect fiber optic equipment, fiber distribution frames have been developed. Examples of prior art fiber distribution frames are shown in commonly assigned U.S. Pat. Nos. 4,995,688; 5,497,444; and 5,758,003 to ADC Telecommunications, Inc. In each of the fiber distribution frames of the prior patents, a plurality of adapters are provided which permit attachment of fiber optic connectors to both sides of each adapter in order to optically couple two fiber optic cables. Cables from the adapters are connected to various pieces of fiber optic equipment. Using patch cords or cables between the adapters, the pieces of optical equipment are then cross-connected through the frame. The frame defines a demarcation point between the equipment.

The use of modular fiber optic connector modules is known for performing so-called cross-connect applications. U.S. Pat. Nos. 5,432,875; 5,363,465; and 6,208,796 to ADC Telecommunications, Inc. concern fiber optic connector modules and chassis designs for receiving the modules in cross-connect applications.

U.S. Pat. No. 6,556,763 also to ADC Telecommunications, Inc., concerns a fiber distribution frame with connector modules. The connector modules of the '763 patent slide into termination modules held by the frame.

Notwithstanding advances previously made in the art, there is a continuous need for further advances to maintain a high-density of connector terminals. There are further needs for ready access to the fiber optic connectors and couplers, enhanced fiber management, and avoidance of excessive bending and stresses on the fiber optic cables.

SUMMARY

The present invention relates to a fiber optic termination module or chassis comprising a housing having first and second spaced apart ends, and first and second spaced apart sides extending between the ends. The housing includes a rear extending between the first and second ends, and the first and second sides to define an interior. The housing defines an open front, with the first and second ends extending generally horizontally, and the first and second sides extending generally vertically when the termination module is mounted to the telecommunications rack. The termination module slideably receives modular fiber optic units or fiber optic modules through the open front. The fiber optic modules include fiber optic connection locations on the front, such as adapters for connecting to cables, and fiber optic circuitry disposed within the interior of the fiber optic module. The termination module, which receives the fiber optic module, preferably includes shelves, slides, guides, or other structure for holding each module. A retention mechanism allows a selected fiber optic module to slide partially outwardly from the termination module to a retained position to allow access to the front connection locations without interfering with the connection locations of adjacent fiber optic modules. Preferably, the fiber optic modules are at a non-perpendicular angle relative to a plane defined by the rear of the termination module.

A further aspect of the present invention relates to a fiber optic module including a housing having two spaced-apart major sides interconnected by two spaced-apart minor sides, and a rear. A plurality of adapters are provided on a front of the housing for use in connecting to cable connectors. Circuiting is disposed within the housing for connecting the front adapters. The module preferably includes at least one side flange extending from one of the major sides, and at least one front flange extending from the front for mounting to a fiber optic termination module or other rack structure. The module includes an open front, which received the adapters. Preferably, the adapters snap to apertures in the major sides.

Another aspect of the present invention relates to a fiber distribution frame comprising a rack extending vertically from a bottom to a top, the rack defining a left side, a right side, a front, and a rear. The frame includes a left vertical cable guide with a side access on the left side of the rack, and a right vertical cable guide with a side access on the right side of the rack. At least a portion of the frame defines a cable termination area. The termination area includes: (1) a first panel defining an array of termination locations on a front portion, the first panel positioned on the left side of the rack adjacent to the left vertical cable guide, and (2) a second panel defining an array of termination locations on a front portion, the second panel positioned on the right side of the rack adjacent to the right vertical cable guide. The frame also includes a horizontal passageway for patch cables positioned on the front side of the rack extending between the right vertical cable guide, and the left vertical cable guide. The first and second panels are defined by adapters associated with modular units for housing fiber couplers, such as splitters, combiners, and wave division multiplexers. The modular units are selectively, partially removable to allow access to the adapters of the selected modular unit without interference from adjacent modular units. Preferably, the modular units are retained with the frame when in the partially removed position.

BRIEF DESCRIPTION OF THE DRAWINGS

FIG. 9 is a front and left side view of the termination module of FIGS. 7 and 8, taken from a position looking into the termination module in the direction of sliding movement of each of the fiber optic modules;

FIG. 10 is a front, top and right side perspective view of the termination module relative and fiber optic modules of FIG. 7, and showing one of the fiber optic modules partially removed from a remainder of the fiber optic modules;

DETAILED DESCRIPTION

Figure 1:
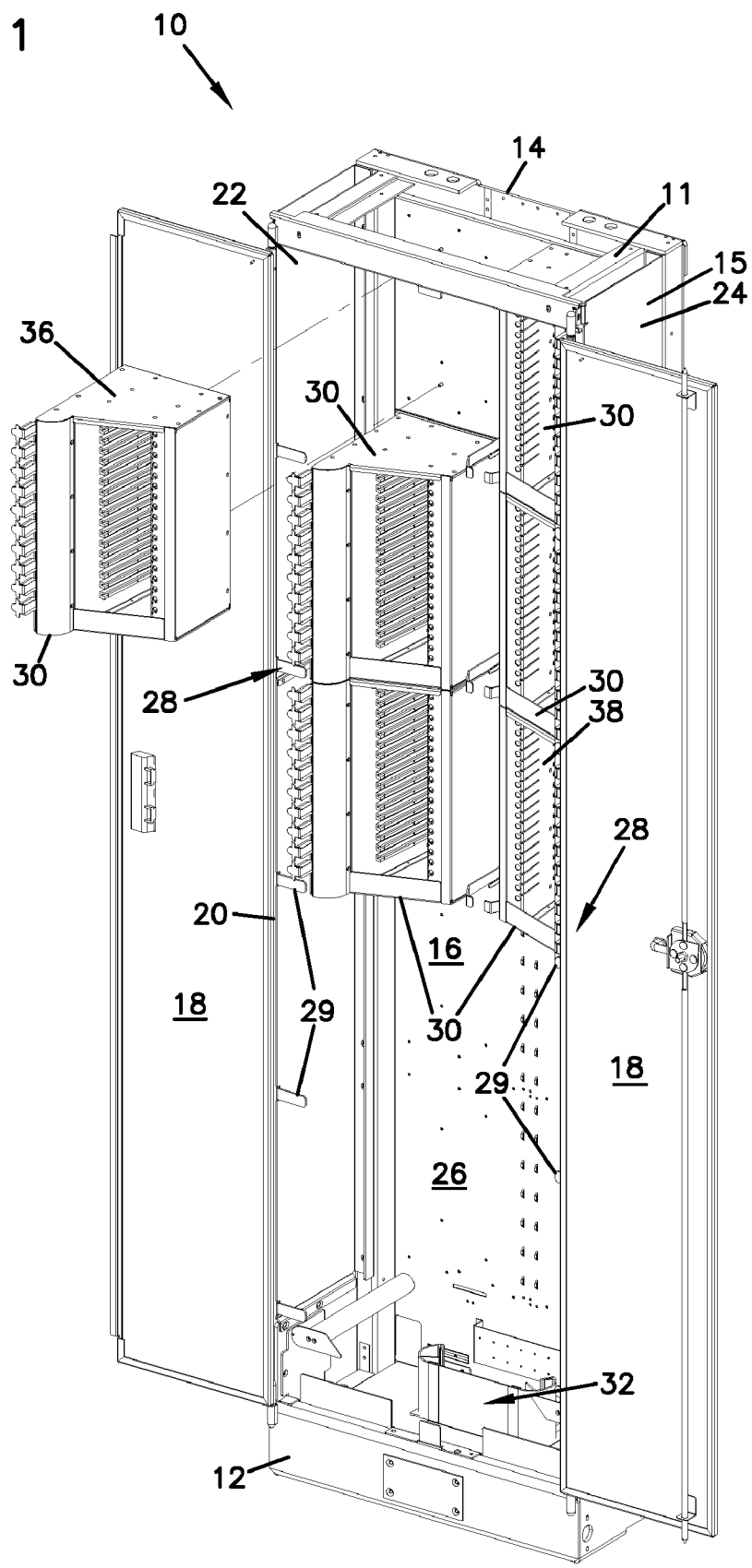
FIG. 1 is a front, top, and right side perspective view of a first embodiment of a fiber frame according to the present invention, with one left side chassis or termination module shown in exploded view, and with the front doors open.

In FIG. 1, a preferred embodiment of a bay or frame 10 is shown for terminating, and managing fiber optic cables within the frame. Frame 10 includes a rack 11 having a bottom 12, a top 14, and an enclosure 15 having an interior 16. Hinged doors 18 allow selective access to an open front 20 for accessing the interior 16.

Enclosure 15 of frame 10 further includes left and right sides 22, 24, and a rear 26. Left and right sides 22, 24 include cable management structure 28 in the form of fingers 29 for managing cables within frame 10. Also, received within the interior of frame 26 is a plurality of chassis or termination modules 30.

As shown in FIG. 1, only an upper portion of frame 10 is populated with termination modules 30. A lower portion of frame 10 can be populated with additional termination modules 30, or other cable management structures including cable splicing. Earlier U.S. Pat. No. 6,556,763 to ADC Telecommunications, Inc. shows various cable splicing structures, which can be utilized within frame 10. The disclosure of U.S. Pat. No. 6,556,763 is hereby incorporated by reference.

Frame 10 further includes horizontal cable management structure 32 adjacent to bottom 12 for managing cables passing between the left and right sides of frame 10. Such cabling may pass from cable management structure 28 positioned on each side of frame 10.

Frame 10 includes a plurality of termination modules 30. In preferred embodiments, termination modules 30 are provided with either a left hand arrangement 36 or a right hand arrangement 38 for use on left and right sides, respectively, of frame 10. The left and right hand arrangements 36, 38 assist with cable management and avoidance of excess bending on the cables. In the preferred embodiment, the cables are angled toward the left or rights sides 22, 24 of frame 10. The left and right hand arrangements 36, 38 are generally mirror images of each other.

Figure 3:
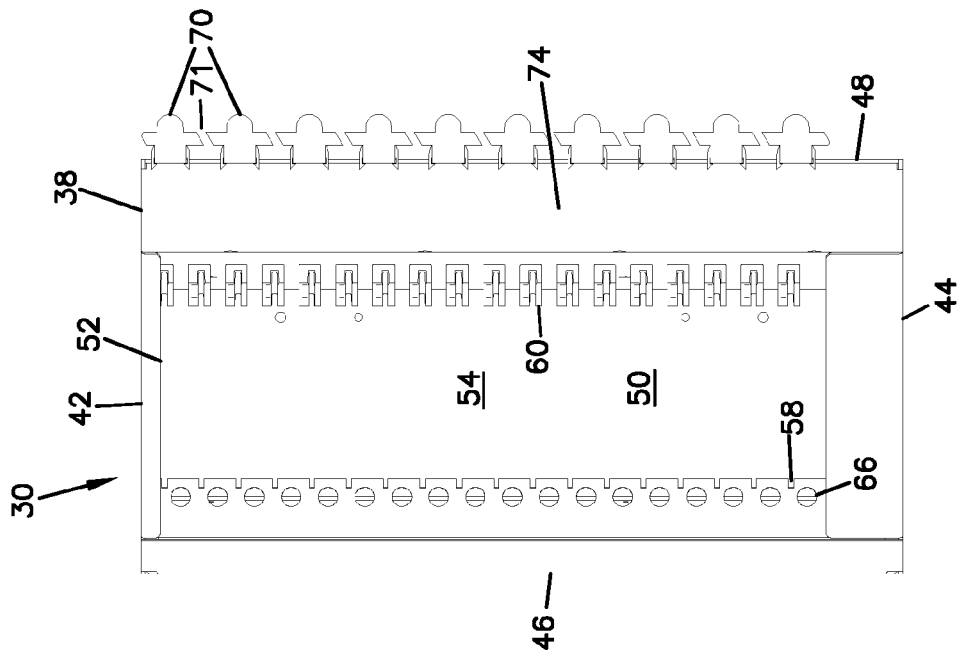
FIG. 3 is a front view of the termination module of FIG. 2.
Figure 2:
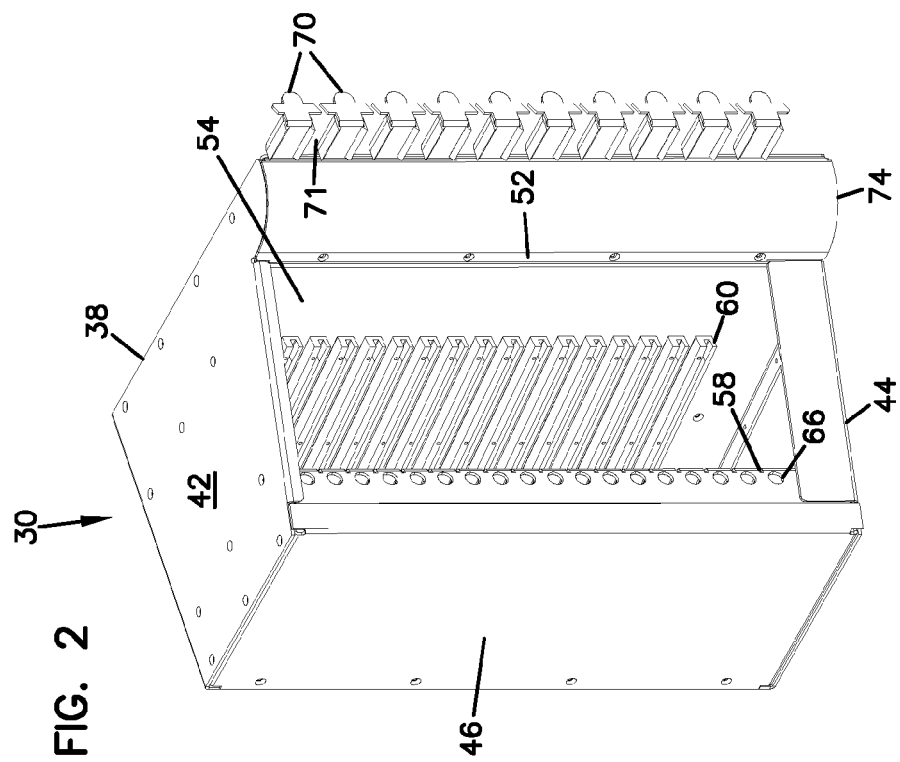
FIG. 2 is a front, top, and left side perspective view of one of the right side termination module from the frame of FIG. 1.
Figure 5:
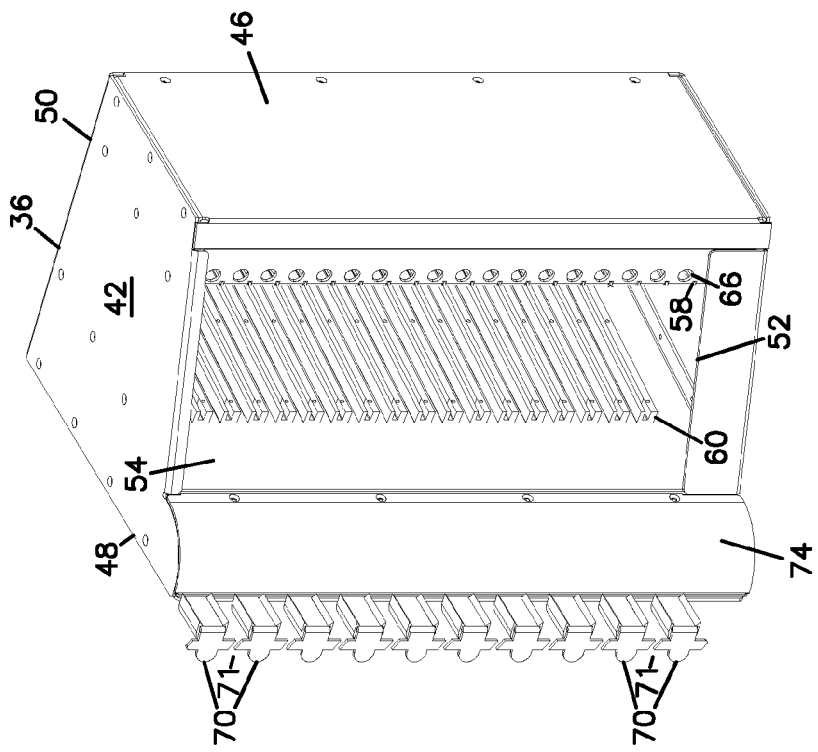
FIG. 5 is a front, top and right side perspective view of one of the left side termination modules from the frame of FIG. 1.
Figure 4:
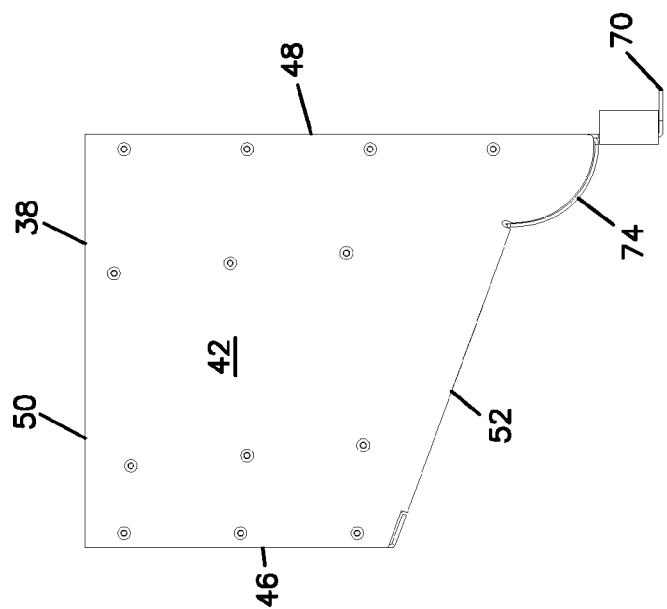
FIG. 4 is a top view of the termination module of FIG. 2.
Figure 6:
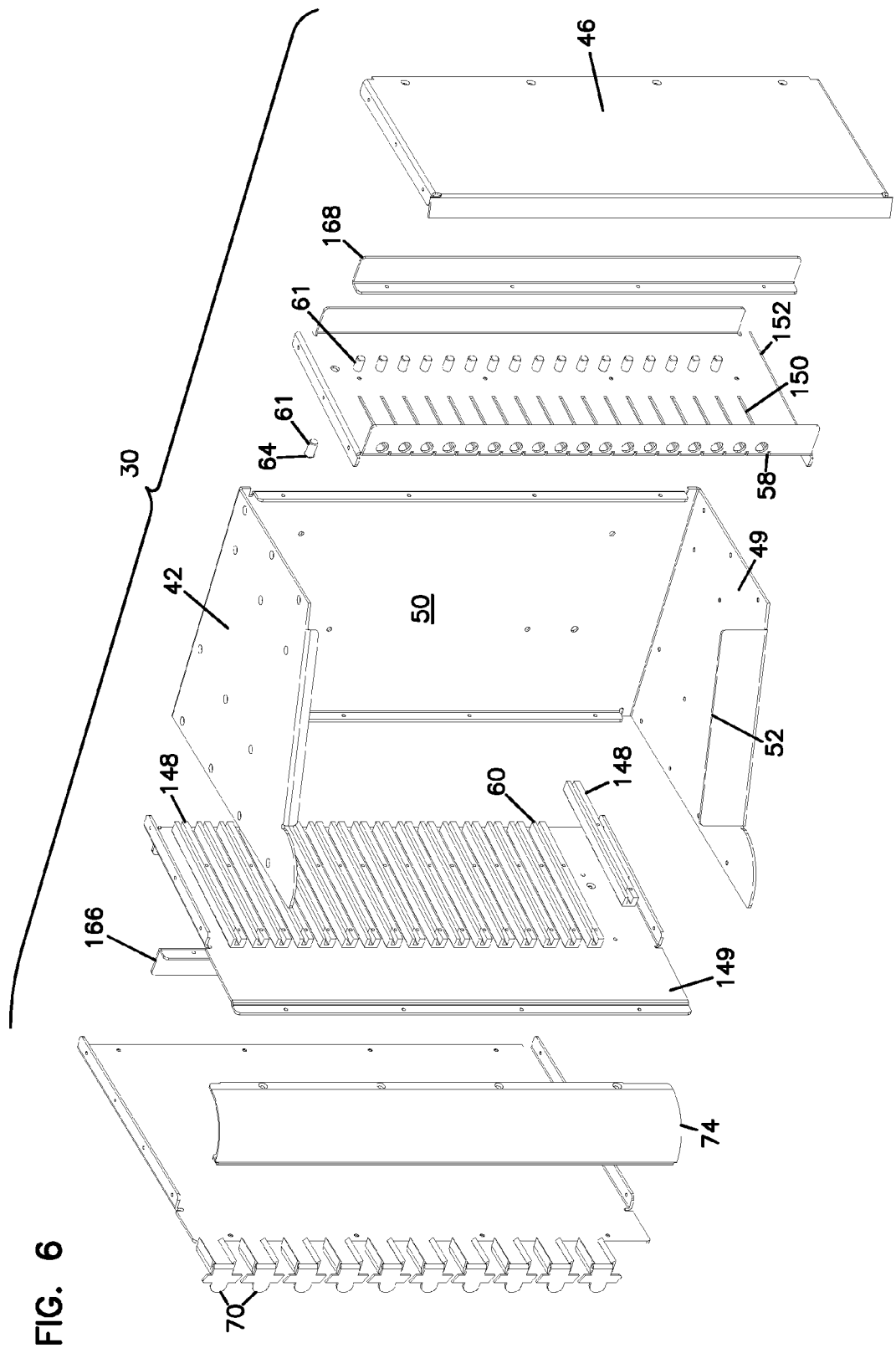
FIG. 6 is an exploded view of the termination module of FIG. 5.

Referring now to FIGS. 2 through 4, one of the right hand arrangements 38 for termination module 30 is shown. Termination module 30 includes first and second ends 42, 44, first and second sides 46, 48, and a rear 50. A front end 52 is generally open for receipt of fiber optic modules, as will be described below. Termination module 30 defines an interior 54 for receipt of the fiber optic modules. Interior 54 includes first and second longitudinal guides 58, 60 for slideably receiving the fiber optic modules in a linear direction. Termination module 30 further includes a module retention mechanism 61 for retaining the fiber optic modules with the termination module. In particular, the retention mechanism 61 holds the fiber optic modules with the termination module 30 when a selected fiber optic module 80 is partially removed from the termination module (see FIGS. 7-10). The retention mechanism of the illustrated embodiment includes a spring biased ball plunger 64 (see also FIG. 22). Interaction between the ball plunger 64 with the fiber optic modules will be discussed in greater detail below. Other retention mechanisms are possible for holding the fiber optic modules 80 in the partially removed position.

Termination module 30 further includes structure for retaining each fiber optic module with the termination module when the fiber optic module is fully inserted into interior 54. In the illustrated embodiment, termination module 30 includes apertures 66 for receipt of a fastener, lock or latching element for each fiber optic module, as will be discussed in greater detail below.

Termination module 30 includes cable management structure in the form of cable guides 70 defining passages 71 for receiving cables extending toward front end 52 of termination module 30. Termination module 30 further includes a curved panel 74 to further prevent cable damage by not allowing the cables extending toward front end 52 to be bent below the minimum bend radius which might cause cable damage and loss of performance. Fingers 29 of frame 10, sides 22, 24 and cable guides 70 define vertical channels for cables extending to and from termination modules 30. The cables can extend vertically upward out of frame 10, or downward into the floor of a raised floor system. Alternatively, the cables can pass horizontally from one side of frame 10 to the other, or to other adjacent frames.

Figure 8:
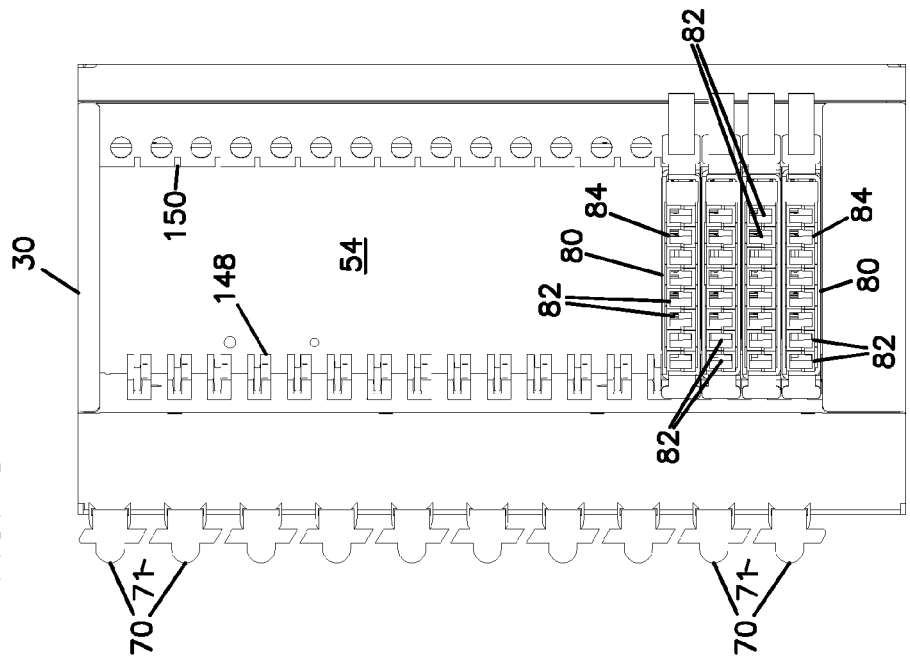
FIG. 8 is a front view of the termination module and fiber optic modules of FIG. 7.
Figure 7:
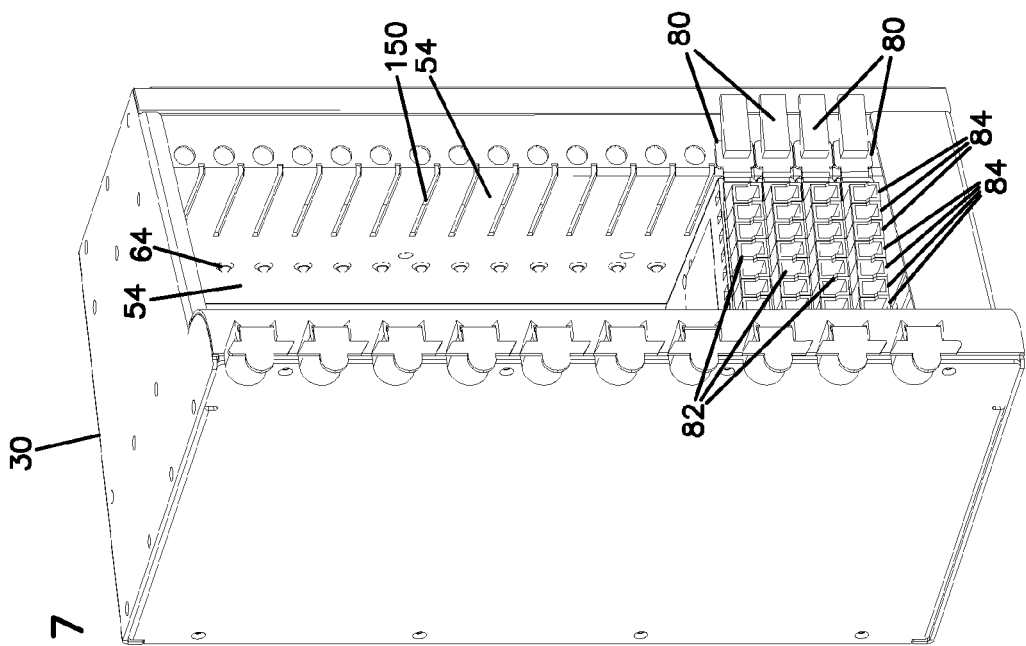
FIG. 7 is a front, top and left side perspective view of the termination module of FIG. 5 showing four fiber optic modules of a first embodiment mounted within the termination module.
Figure 12:
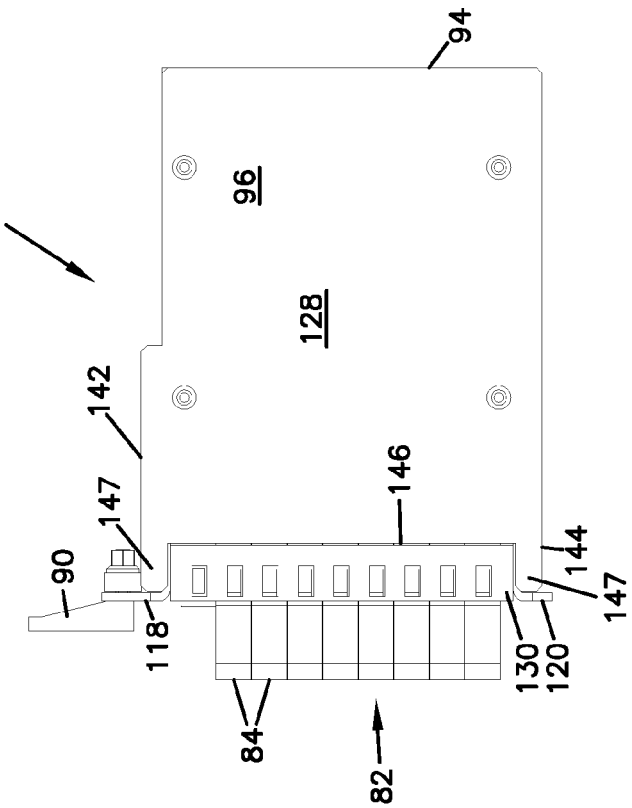
FIG. 12 is an opposite side view of the fiber optic module of FIG. 11.

Referring now to FIGS. 7 through 10, one of termination modules 30 is shown with a plurality of fiber optic modules 80 received within interior 54. Additional fiber optic modules 80 can populate the remaining open space of termination module 30. As shown in FIGS. 7 through 9, each fiber optic module 80 presents a plurality of connection locations 82 defined by fiber optic adapters 84. Adapters 84 can be any of a variety of fiber optic adapters desired for use in frame 10. In particular, fiber optic adapters such as SC, E2000, LC or LX.5 (by ADC Telecommunications, Inc., and shown in U.S. Pat. Nos.

5,883,995 and 6,142,676). Alternatively, other adapters can be utilized. Adapters 84 define the connection locations 82 for connecting to connectors on the ends of fiber optic cables. On an opposite end of adapters 84, disposed within fiber optic modules 80, adapters 84 also receive a fiber optic connector associated with the internal circuitry of fiber optic modules 80.

Still referring to FIGS. 7 though 9, fiber optic modules 80 within termination module 30 present a dense arrangement of the connection locations 82. Should access to a selected connection location 82 be desired, such as for connecting or disconnecting a cable connector to one of adapters 84, an operator may have a difficult time accessing the selected connector and adapter without disrupting other connections. Referring now to FIG. 10, one of fiber optic modules 80 is shown partially removed from termination module 30 so as to improve the ease of access by the operator to the selected connection location 82. In FIG. 10, the lowermost fiber optic module 80 is shown partially removed to improve access to adapters 84 of the partially removed module.

Termination module 30 cooperates with each fiber optic module 80 to hold fiber optic modules 80 in the fully inserted position. Termination module 30 also cooperates with each fiber optic module 80 to allow for partial removal of selected fiber optic modules 80 as shown in FIG. 10. A latch 90 on each module 80 securely retains each fiber optic module 80 with termination module 30. Latch 90 as shown is a swell latch which cooperates with apertures 66 of termination module 30. When latch 90 is released, by flipping the latch, the selected fiber optic module 80 can be removed from termination module 30 if desired.

Fiber optic module 80 can also be retained in the position shown in FIG. 10 for the lowermost fiber optic module 80. As will be described below, fiber optic module 80 includes structure which cooperates with the ball plunger 64 of termination module 30 to hold the partially removed fiber optic module 80 to termination module 30.

Figure 11:
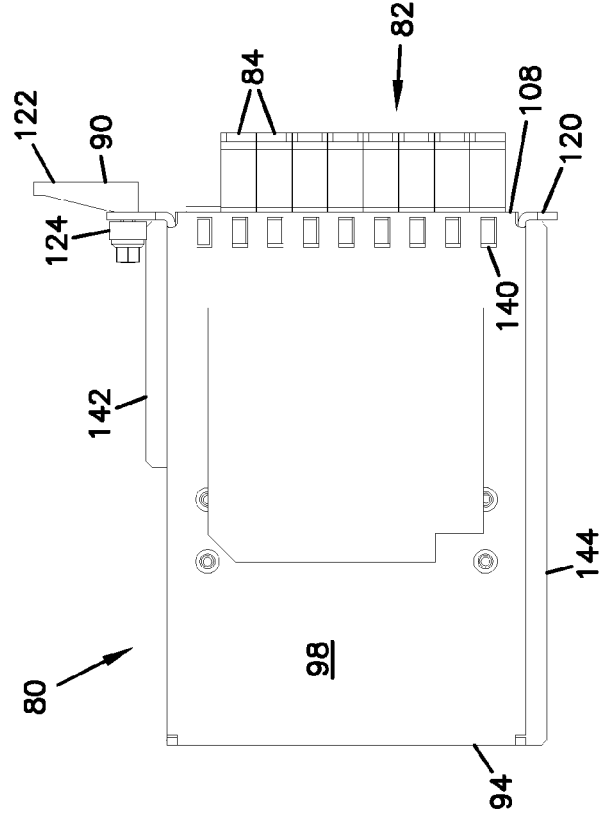
FIG. 11 is a first side view of one of the fiber optic modules shown in FIGS. 7 through 10.
Figure 13:
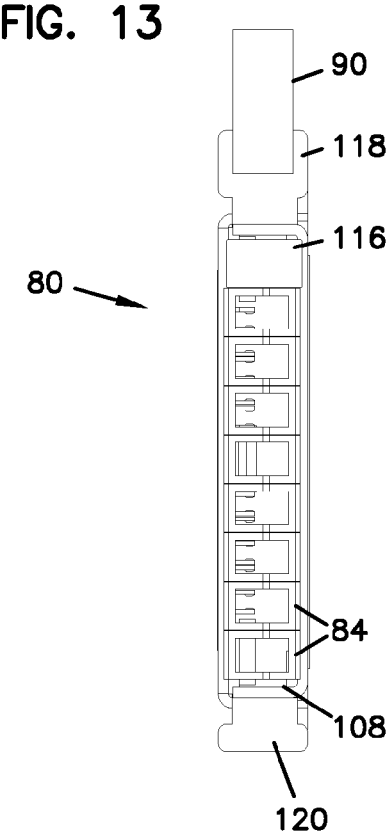
FIG. 13 is a front view of the fiber optic module of FIGS. 11 and 12.
Figure 14:
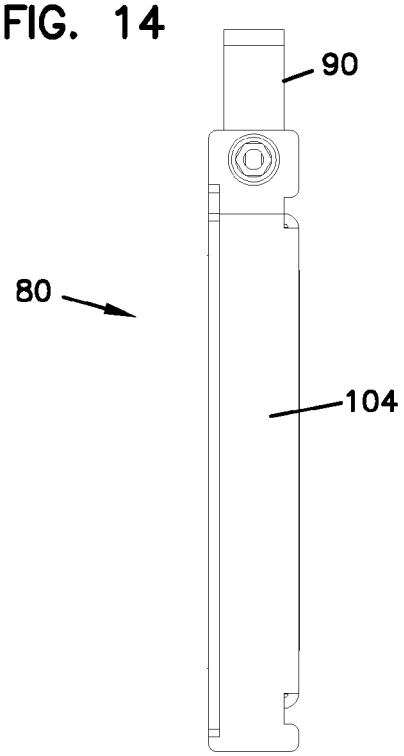
FIG. 14 is a rear view of the fiber optic module of FIGS. 11 and 12.
Figure 15:
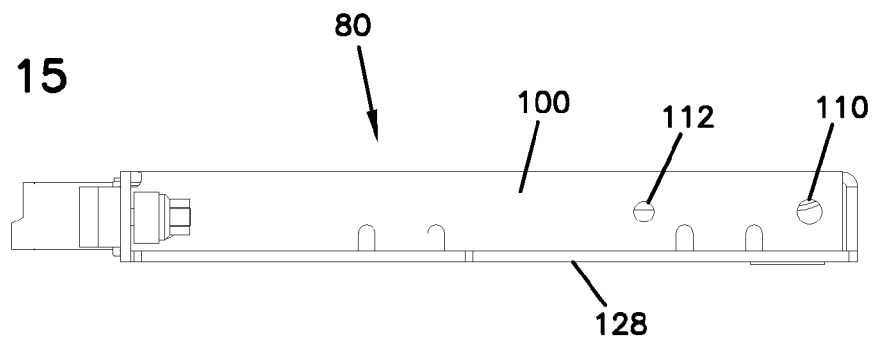
FIG. 15 is a first end view of the fiber optic module of FIGS. 11 and 12.
Figure 16:
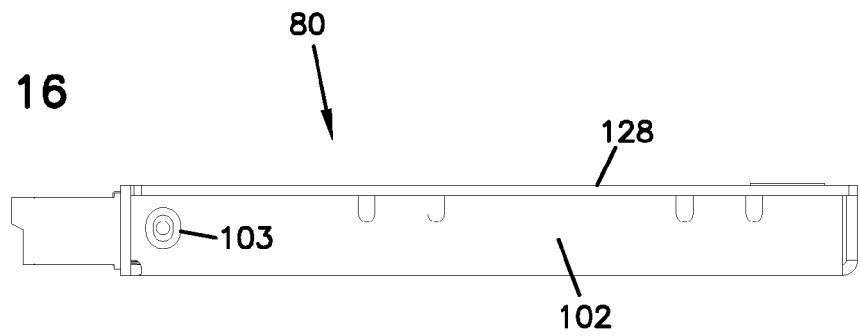
FIG. 16 is an opposite end view of the fiber optic module of FIGS. 11 and 12.
Figure 19:
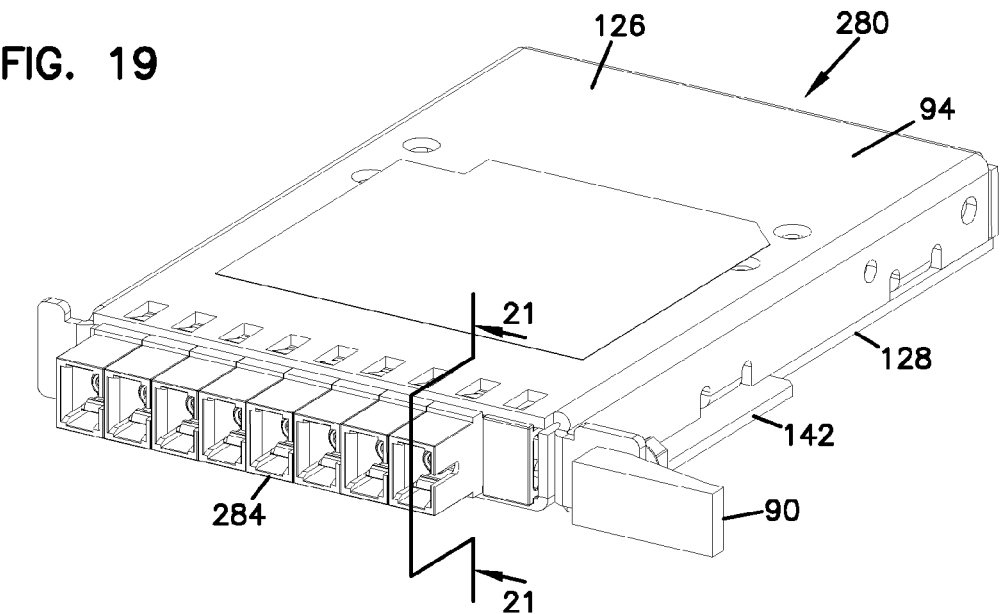
FIG. 19 is a perspective view of a second embodiment of a fiber optic module.
Figure 21:
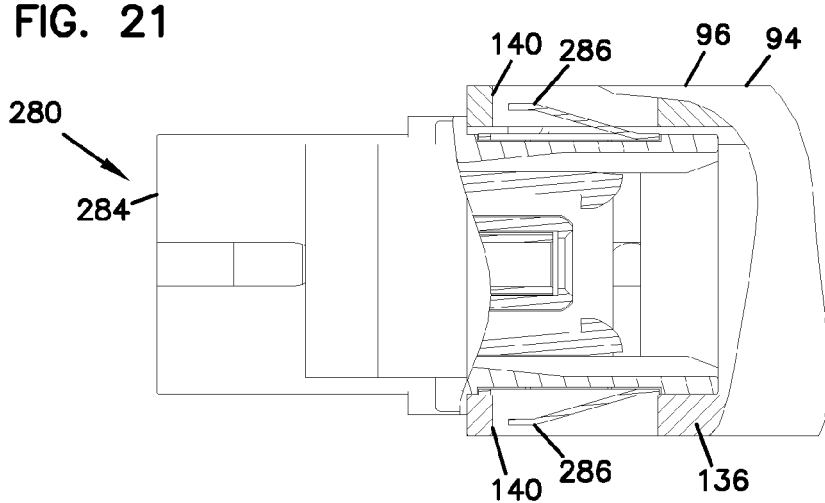
FIG. 21 is a partial cross-sectional view of a portion of the fiber optic module of FIGS. 19 and 20 showing the connection between one of the adapter, and the module housing taken along lines 21-21 of FIG. 19.
Figure 20:
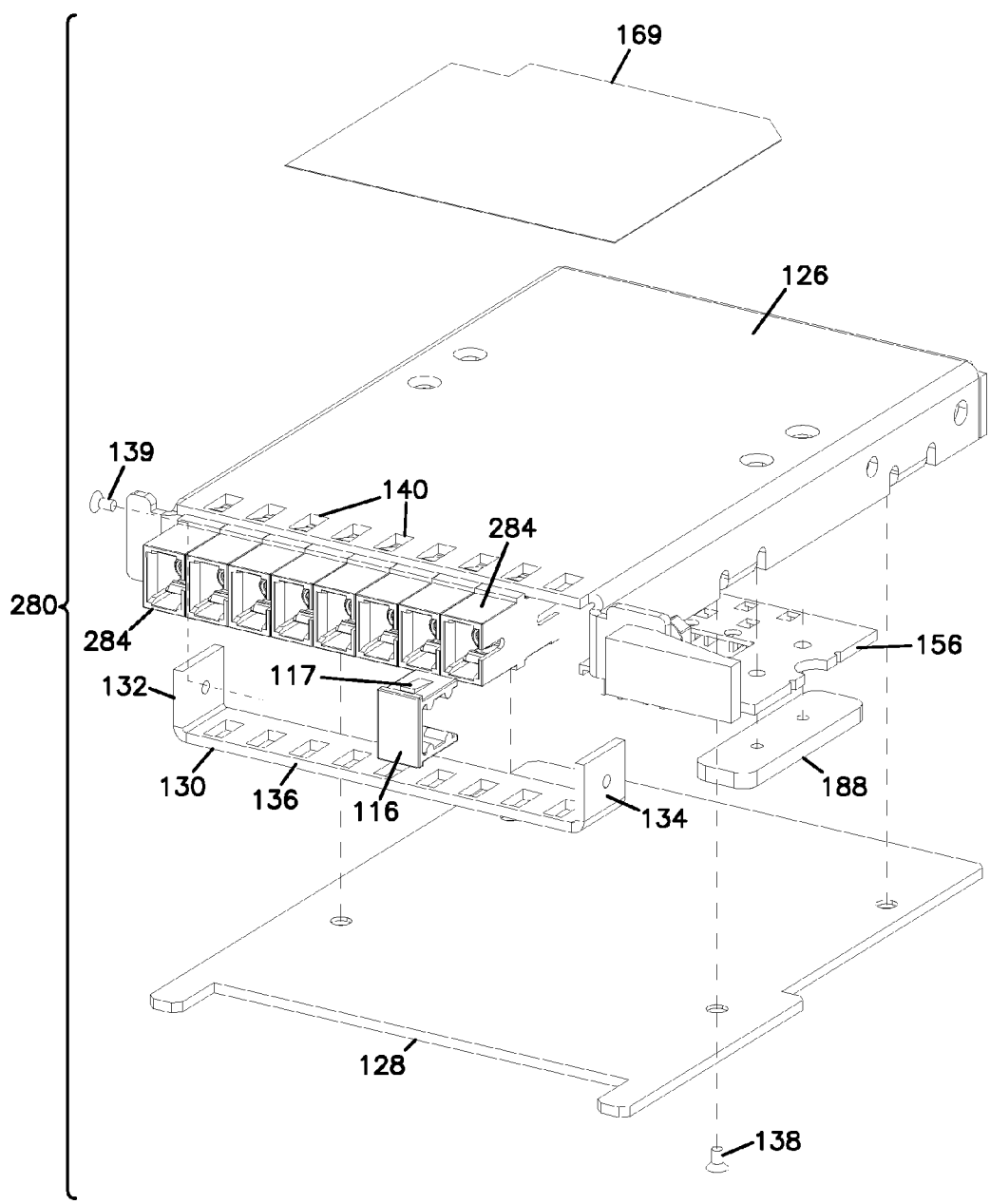
FIG. 20 is an exploded perspective view of the fiber optic module of FIG. 19.

Referring now to FIGS. 11 though 18, one of fiber optic modules 80 is shown in greater detail. Module 80 has a housing 94 including first and second major sides 96, 98, and first and second minor sides 100, 102. A rear end 104 cooperates with major sides 96,98 and minor sides 100, 102 to define an interior 106 for housing fiber optic components and cables. FIGS. 19-21 show a second embodiment of a fiber optic module 280, with a similar housing construction. Module 280 includes the same housing 94, but uses different adapters 284.

Major sides 96, 98 and minor sides 100, 102 define an open front end 108, which receives fiber optic adapters 84. If desired, a blank 116 can be mounted at front end 108 instead of an adapter 84. As shown, module 80 has room for nine adapters or blanks.

Preferably, module 80 includes first and second front flanges 118, 120. As shown, front flange 118 holds latch 90. Latch 90 is a swell latch including a pivoting handle 122, and an expandable end 124 for receipt in opening 66 in termination module 30. Other latches, locks or fasteners can be used to retain module 80 in the fully inserted position.

In the preferred embodiment of fiber optic module 80, minor sides 100, 102, major side 98, and rear end 104 are integrally formed from a single housing structure or main portion 126, such as bent sheet metal. This single housing structure 126 can also include front flanges 118, 120. Further in the preferred embodiment, major side 96 includes a cover portion 128, and a front end portion 130. In the preferred embodiment, front end portion 130 includes a U-shape with ends 132, 134 and a central extension 136 positioned therebetween (see also FIG. 20).

Front end portion 130 and cover portion 128 are preferably also made from convenient structures, including sheet metal. Threaded fasteners 138 mount cover portion 128 to main portion 126 of fiber optic module 80. Threaded fasteners 139 further mount front end portion 130 to main portion 126. Fastener holes 103 in minor sides 100, 102 are preferably elongated to allow for a variety of spacings of front end portion 130 relative to main portion 126. Such a feature is desirable to accommodate adapters of differing dimensions for different modules. Main portion 126 includes a cutout 146 with projections 147 on opposite ends which receives end portion 130.

As noted above adapters 84 mount to front end 108 of fiber optic module 80. In the preferred embodiment, a line of apertures 140 is provided in each of major sides 96, 98 so as to receive attachment structure of each adapter 84. In the preferred embodiment, adapters 84 include projections 86 such as spring arms or latch portions or other structures, which are received in apertures 140. Similarly, blank 116 includes projections 117 for receipt in aperture 140 (see FIG. 20). By defining a front end 108 of fiber optic module 80 by the edges of major sides 96, 98, a thinner module can be provided. Thinner modules allow for greater densities of adapters 84 in a given footprint within frame 10 and termination module 30. With increased density may come the likelihood of more difficulty in accessing individual adapters 84. The present invention allows for partial removal of the fiber optic module 80 at the selected time. The operator can individually access the selected module 80 without disrupting other cables and connections on adjacent modules. Preferably front end portion and major side 98 are made from thin sheet metal such as aluminum, at least 0.080 inches thick, so as to engage the spring arms of the adapter.

Module 80 includes flanges 142, 144 defined by cover portion 128. Flanges 142, 144 cooperate with first and second longitudinal guides 58, 60 of termination module 30 to slideably move into and out of termination module 30. In the preferred embodiment, flanges 142, 144 are planar structures extending beyond minor sides 100, 102 of fiber optic module 80. Longitudinal guides 58, 60 of termination module 30 are shown in one possible implementation including channel defining inserts 148 mounted on first interior panel 149 for first longitudinal guides 58, and slots 150 in second interior panel 152 defining second longitudinal guides 60. Both channel defining inserts 148 and slots 150 each receive one of flanges 142, 144.

Termination module 30 includes various panel elements 42, 44, 46, 48, 149, and 152 that can be made from any convenient housing material, such as sheet metal. Supports 166, 168 strengthen first and second interior panels 149, 152 in the preferred embodiment.

Termination module 30 preferably angles the adapters 84 toward cable guides 70. Such angling helps avoid excessive bends on the front cables extending toward fiber optic modules 80 positioned in termination module 30. Such angling is achieved by angling longitudinal guides 58, 60 toward cable guides 70. FIG. 8 shows a view into termination module 30 perpendicular to the planar rear 50. As can be seen in FIG. 8, inserts 148 and slots 150 are not perpendicularly positioned, but at a slight angle, such as 5 degrees, relative to rear 50. FIG. 9 shows a view of termination module 30 from the slight angle toward guides 70 showing the inserts 148 and slots viewed perpendicularly.

It is further preferred that fiber optic module 80 can be utilized either in the left hand arrangement 36 or the right hand arrangement 38 for termination modules 30 by merely flipping the module 180 degrees upside down from the left side to the right side of frame 10. Left and right hand arrangements 36, 38 are constructed so as to accommodate the flanges 142, 144 as modules 80 are flipped between the left and right sides.

Figure 17:
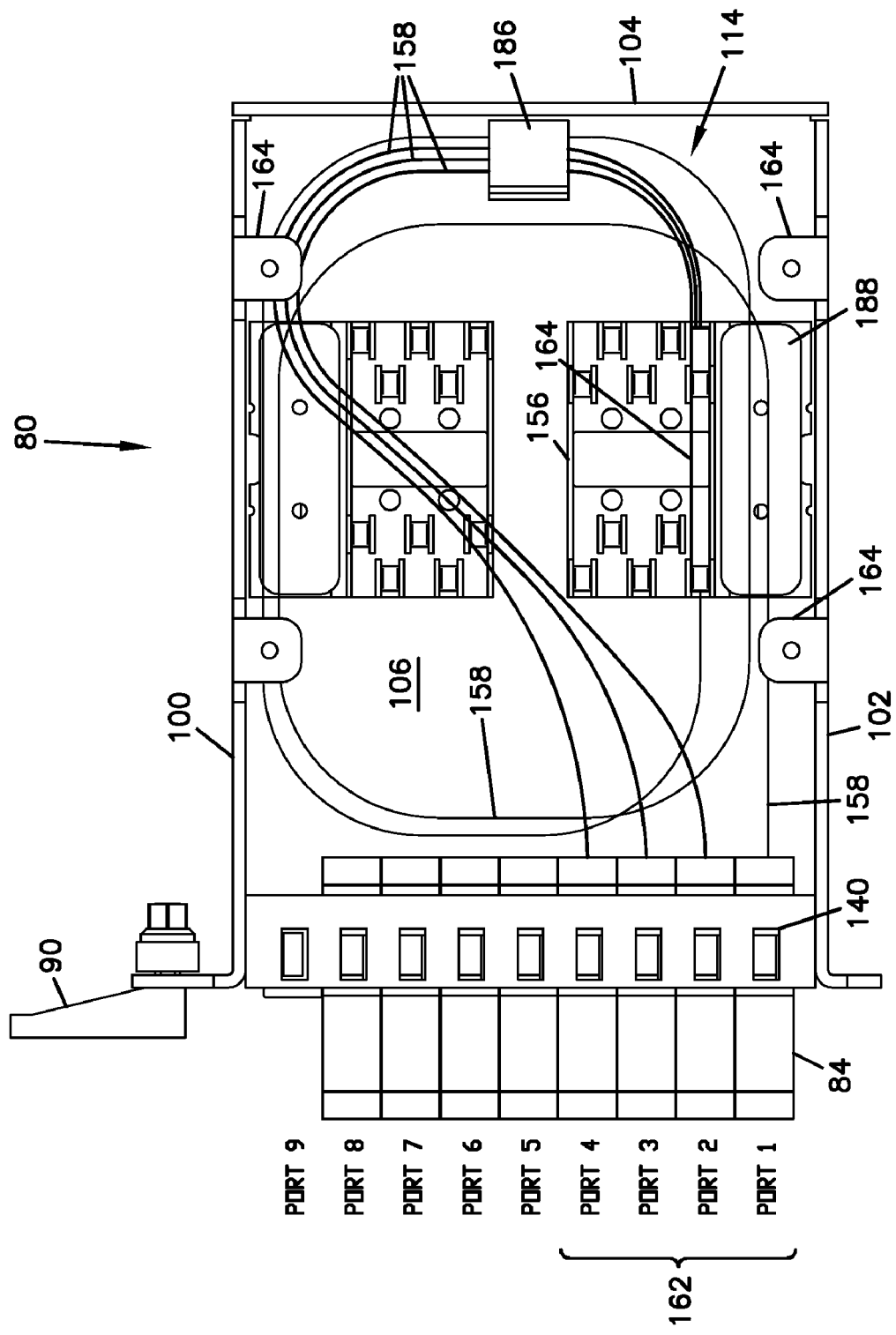
FIG. 17 is a view of the fiber optic module of FIG. 12 with the cover portion removed showing interior structures.
Figure 18:
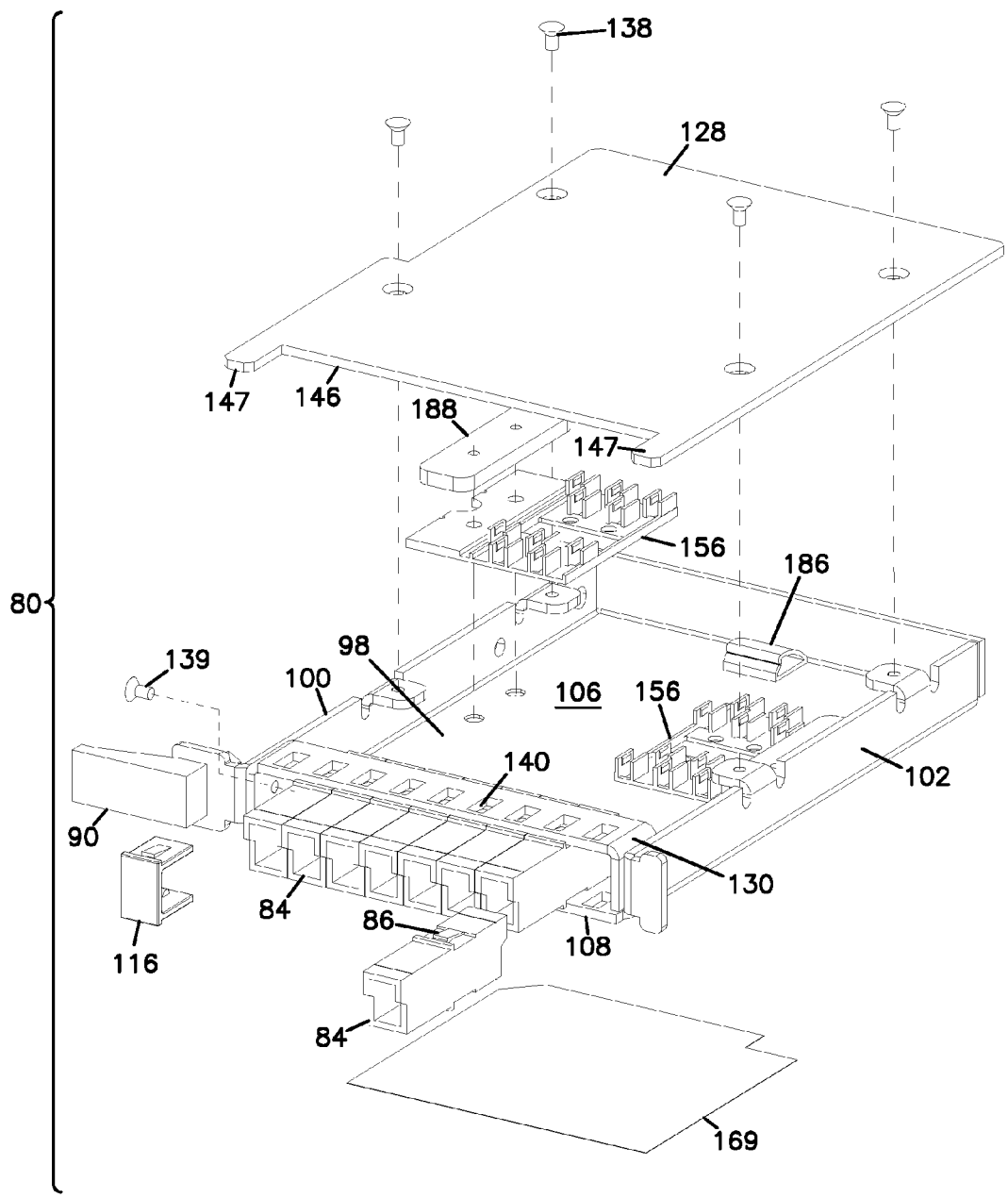
FIG. 18 is an exploded perspective view of the fiber optic module of FIGS. 11 through 17.

Referring now to FIGS. 17 and 18, the fiber optic circuitry 114 is illustrated within interior 106 of fiber optic module 80. Fiber optic couplers 164 are held by holders 156. A mounting plate 188 mounts each holder 156 to major side 98, such as with threaded fasteners (not shown). Internal cables 158 connect to rear ends of the adapters 84 through mating connectors (not shown). A variety of fiber optic circuitry can be utilized including fiber optic splitters, WDM's, DWDM's, and any other passive optical circuitry. In some embodiments, it may be desirable to have straight pass through connections, with monitoring ports. In that case, there would be one input, one output and one monitor port per circuit. Module 80 could hold three of those circuits. FIG. 17 shows a 1×3 optical splitter circuit 162. In FIG. 17, module 80 could house two 1×3 optical splitters, with one blank 116. Schematic label 169 can be added to module 80 to illustrate or describe the circuit functions for the operator.

Mounting tabs 164 for mounting main portion 126 to cover portion 128 are also used to retain cables 158 during assembly, before cover portion 128 is closed. Cable clip 186 assists with cable management.

Referring now to FIGS. 19 through 21, second embodiment of a fiber optic module 280 is shown. One difference over fiber optic module 80 is shown with respect to adapters 284. Adapters 284 are SC type, whereas adapters 84 are E2000 type. FIG. 21 shows in greater detail receipt of projections, e.g., spring arms 286, within apertures 140 of module housing 94. If adapters 284 were taller or shorter than adapters 84, the spacing between extension 136 and major side 96 can be adjusted with elongated holes 103 in minor sides 100, 102.

Figure 22:
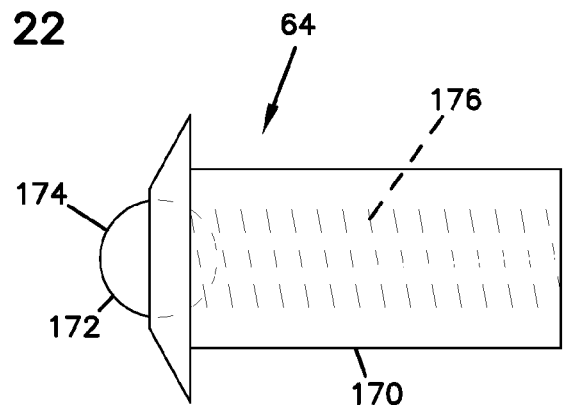
FIG. 22 is a side view of one of the ball plungers of the termination module of FIGS. 1 though 10.

Referring now to FIG. 22, an example ball plunger 64 is shown including a housing 170 which holds a ball 172 with a projecting end 174. An internal spring 176 biases ball 172 to the position shown. Ball plunger 64 is positioned within interior 54 of termination module 30 to retain each module 80 with termination module 30. Ball plungers 64 are press-fit into panel 152 of termination module 30. When fiber optic module 80 is partially removed from interior 54 of termination module 30, end 174 of ball 172 is received opening 110 in minor side 100 of module 80. With ball plunger 64 engaging opening 110, module 80 is retained by termination module 30 in the partially removed position. The engagement of ball plunger 64 with opening 110 provides a lock for retaining or holding module 80 while the operator accesses the desired connection location. In the case of the operator removing a connector from one adapter 84, ball plunger 64 holds module 80 in the partially removed position so that the operator can pull the connector from the selected adapter 84. In so doing, the operator does not need to also hold module 80 to retain module 80 with termination module 30. The force needed to disconnect the connector from the selected adapter 84 is less than the force which holds fiber optic module 80 with termination module 30.

Should the operator desire to remove fiber optic module 80 entirely from termination module 30, the force provided by ball plunger 64 engaging opening 110 can be overcome by the operator grasping the front end 108 of module 80 and pulling outwardly.

In the preferred embodiment, minor side 100 of fiber optic module 80 is further provided with a second opening 112 for holding end 174 of ball 172 when module 80 is fully inserted into termination module 30. Such retention feature is optional since latch 90 retains each fiber optic module 80 with the termination module 30 in the fully inserted position. However, with a retainer arrangement utilizing ball plungers 64, some stress relief may be needed by termination module 30 so as to not bow out panel 152. If desired, second opening can be smaller than first opening 110.

Other retention mechanisms are anticipated for holding and retaining fiber optic modules 80 with termination modules 30 in the partially removed positions. For example, a leaf spring can project inwardly from panel 152 for engagement with structure on fiber optic module 80, including openings in minor side 102, or flange 144.

While the preferred adapters 84, 284 and others noted herein include opposed projections for mounting to apertures 140 in each of major sides 96, 98, other adapters can be used. For example, ST and FC type may be used if an appropriate adapter member is used to link each adapter to module 80 and apertures 140.

It is to be appreciated that the fiber optic module retention features of the present invention can be used with other frames besides frame 10 including termination modules 30. Also, termination modules 30, with the fiber optic module retention mechanism for holding the modules in the partially removed position, can be used with other fiber optic modules besides modules 80, 280. In some applications, it may be desirable to provide modules with plural rows of adapters.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A fiber optic module adapted to be held by a frame, the fiber optic module comprising:
   a housing including a top surface and a bottom surface extending parallel to each other, the top and bottom surfaces interconnected by two spaced-apart side surfaces extending parallel to each other, the top surface, bottom surface, and side surfaces extending between front and rear ends of the housing, the front end being open and defined by edges of the surfaces;
   a front end portion mounted at the open front end of the housing, the front end portion defining a plurality of apertures extending through a plane parallel to the top surface of the housing, the front end portion being sized to fit within a perimeter defined by the open front of the housing;
   a plurality of fiber optic adapters mounted to the front end portion at the front end of the housing, each fiber optic adapter having a port facing forwardly of the housing; and
   a front flange coupled to the housing at the open front end, the front flange being configured to latch the housing to the frame.

2. The fiber optic module of claim 1, wherein the housing defines a first side flange that extends planar with the top surface of the housing past a first of the side surfaces.

3. The fiber optic module of claim 2, wherein the first side flange extends planar with the top surface along a direction running between the front end of the housing and the rear end of the housing.

4. The fiber optic module of claim 2, wherein the housing also defines a second side flange that is planar with the top surface of the housing past a second of the side surfaces.

5. The fiber optic module of claim 1, wherein one of the side surfaces defines first and second openings, the first opening being positioned further from the rear end of the housing than the second opening, each of the first and second openings being sized to receive a ball end of a spring loaded ball plunger.

6. The fiber optic module of claim 5, wherein the first and second openings are aligned along a direction running between the front end of the housing and the rear end of the housing.

7. The fiber optic module of claim 5, wherein the first opening is smaller than the second opening.

8. The fiber optic module of claim 1, wherein the housing encloses at least one internal cable extending from a first end to a second end, the first end being plugged into rear ports of the fiber optic adapters.

9. The fiber optic module of claim 8, wherein the housing also encloses a passive optical device to which the second end of the internal cable is optically coupled.

10. The fiber optic module of claim 9, wherein the passive optical device comprises an optical splitter.

11. The fiber optic module of claim 9, wherein the passive optical device comprises a straight through connector.

12. The fiber optic module of claim 1, wherein the top surface of the housing defines a second plurality of apertures that align with the apertures defined by the front end portion.

13. The fiber optic module of claim 12, wherein each of the fiber optic adapters includes projections that fit into the apertures of the front end portion and the top surface.

14. The fiber optic module of claim 1, further comprising a second front flange coupled to the housing at the open front end opposite the first front flange, the second front flange being smaller than the first front flange.

15. The fiber optic module of claim 1, wherein the housing encloses holders that are configured to hold couplers.

\* \* \* \* \*